(12) United States Patent
Bain et al.

(10) Patent No.: US 10,795,800 B2
(45) Date of Patent: Oct. 6, 2020

(54) PROGRAMMING LANGUAGE RUNTIME DEFERRED EXCEPTION HANDLING

(71) Applicant: INTERNATIONAL BUSINESS MACHINES CORPORATION, Armonk, NY (US)

(72) Inventors: Peter Douglas Bain, Ottawa (CA); Graham A. Chapman, Nepean (CA); Dan Heidinga, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 16/125,890

(22) Filed: Sep. 10, 2018

(65) Prior Publication Data

US 2020/0081818 A1 Mar. 12, 2020

(51) Int. Cl.
*G06F 11/36* (2006.01)
*G06F 8/30* (2018.01)

(52) U.S. Cl.
CPC .......... *G06F 11/3624* (2013.01); *G06F 8/311* (2013.01); *G06F 11/3688* (2013.01)

(58) Field of Classification Search
None
See application file for complete search history.

(56) References Cited

U.S. PATENT DOCUMENTS

| 6,205,491 | B1* | 3/2001 | Callsen | G06F 9/465 |
| | | | | 719/315 |
| 7,086,066 | B2* | 8/2006 | Kappel | G06F 9/4812 |
| | | | | 714/38.14 |
| 7,310,723 | B1* | 12/2007 | Rozas | G06F 9/30076 |
| | | | | 712/218 |
| 8,146,058 | B2* | 3/2012 | Sarkar | G06F 8/10 |
| | | | | 717/101 |
| 8,429,658 | B2* | 4/2013 | Auerbach | G06F 9/526 |
| | | | | 718/102 |
| 2005/0022186 | A1* | 1/2005 | Accapadi | G06F 9/4818 |
| | | | | 718/100 |
| 2006/0130061 | A1* | 6/2006 | Bauer | G06F 9/526 |
| | | | | 718/100 |
| 2006/0282839 | A1* | 12/2006 | Hankins | G06F 11/3466 |
| | | | | 719/318 |
| 2008/0059676 | A1* | 3/2008 | Archer | G06F 13/24 |
| | | | | 710/260 |
| 2008/0059677 | A1* | 3/2008 | Archer | G06F 9/542 |
| | | | | 710/262 |
| 2010/0011372 | A1* | 1/2010 | Trensch | G06F 9/526 |
| | | | | 718/107 |

(Continued)

OTHER PUBLICATIONS

Parain, "JEP 270: Reserved Stack Areas for Critical Sections", 2018, Oracle (Year: 2018).*

(Continued)

*Primary Examiner* — Hossain M Morshed
(74) *Attorney, Agent, or Firm* — Patrick J. Daugherty; Daugherty & Del Zoppo Co., LPA (57) ABSTRACT

Aspects of the present invention provide devices that count for an application thread levels of critical sections of program code, and in response to a program exception in the application thread that is deferrable and a non-zero count of the levels of critical sections, execute a remainder of program code within the critical sections of program code.

17 Claims, 6 Drawing Sheets

(56) References Cited

U.S. PATENT DOCUMENTS

| | | | |
|---|---|---|---|
| 2010/0107168 A1* | 4/2010 | Auerbach | G06F 12/0269 |
| | | | 718/103 |
| 2013/0298108 A1* | 11/2013 | Oliver | G06F 8/315 |
| | | | 717/116 |
| 2016/0154654 A1* | 6/2016 | Williams | G06F 9/3861 |
| | | | 712/244 |

OTHER PUBLICATIONS

Peter Mell et al, The NIST Definition of Cloud Computing, National Institute of Standards and Technology, Publication 800-145, 2011, entire document.

Pankaj, Exception Handling in Java, http://www.journaldev.com/1696/exception-handling-in-java, 2018, entire document.

Thorsen Janssen, How to Specify and Handle Exceptions in Java, https://stackify.com/specify-handle-exceptions-java/#disqus_thread, 2017, entire document.

Frederic Parain, JEP 270: Reserved Stack Areas for Critical Sections, http://openjdk.java.net/jeps/270, Oracle Corporation, 2018, entire document.

* cited by examiner

PROGRAMMING LANGUAGE RUNTIME DEFERRED EXCEPTION HANDLING

BACKGROUND

The field of computer programming languages includes runtime support and handling of program exceptions.

Computer programming languages can include runtime support and a call stack for each runtime thread. The call stack is a data structure in an area of computer memory with a fixed origin and a variable size with a boundary. The call stack stores return addresses of calling functions, methods or subroutines and can provide space for local variables, and working storage for calculations. The program code can be executed according to a stack discipline by a runtime environment or routine. Each level of program execution adds a stack frame to the stack. For example, as subroutine A is initiated, a stack frame with subroutine A is placed on the stack including the local variables of subroutine A and the program counter is set to the start of executable code or instructions of subroutine A. Subroutine A calls subroutine B, which causes the runtime routine to add another stack frame for subroutine B to the call stack in the stack memory above the memory allocated to subroutine A, such as in a push operation of a stack data structure. As control returns from subroutine B to subroutine A, the stack frame for subroutine B is discarded and the memory in the stack reused, such as in a pop operation of a stack data structure.

During runtime, an executing subroutine can cause an exception or error, such as attempting to place an object on a heap and exceeding the heap size, attempting to allocate another stack frame and exceeding the stack size, exceeding a central processing unit (CPU) time limit, receiving an interrupt from another thread, etc. The program exception returns control to the runtime routine, which examines or walks the call stack in a last in first out (LIFO) order until a context of an exception handler is found to handle or process the error or until the start of the call stack is encountered. The context can include a pointer to the exception handler. The program counter is set to the exception handling program according to the context and the contents of the call stack above the context of the exception handler are discarded. The exception handling is also known as throwing the exception and the exception handler is also known as a catch clause. In the absence of an exception handling program, the call stack is typically discarded and the application execution thread is terminated.

BRIEF SUMMARY

In one aspect of the present invention, a computer-implemented method for handling computer program runtime exceptions includes executing on a computer processor counting for an application thread levels of critical sections of program code, and in response to a program exception in the application thread that is deferrable and a non-zero count of the levels of critical sections, executing a remainder of program code within the critical sections of program code.

In another aspect, a system has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby handles computer program runtime exceptions, which counts for an application thread levels of critical sections of program code, and in response to a program exception in the application thread that is deferrable and a non-zero count of the levels of critical sections, executes a remainder of program code within the critical sections of program code.

In another aspect, a computer program product for handling computer program runtime exceptions has a computer-readable storage medium with computer readable program code embodied therewith. The computer readable hardware medium is not a transitory signal per se. The computer readable program code includes instructions for execution by a processor that cause the processor to count for an application thread levels of critical sections of program code, and in response to a program exception in the application thread that is deferrable and a non-zero count of the levels of critical sections, execute a remainder of program code within the critical sections of program code.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
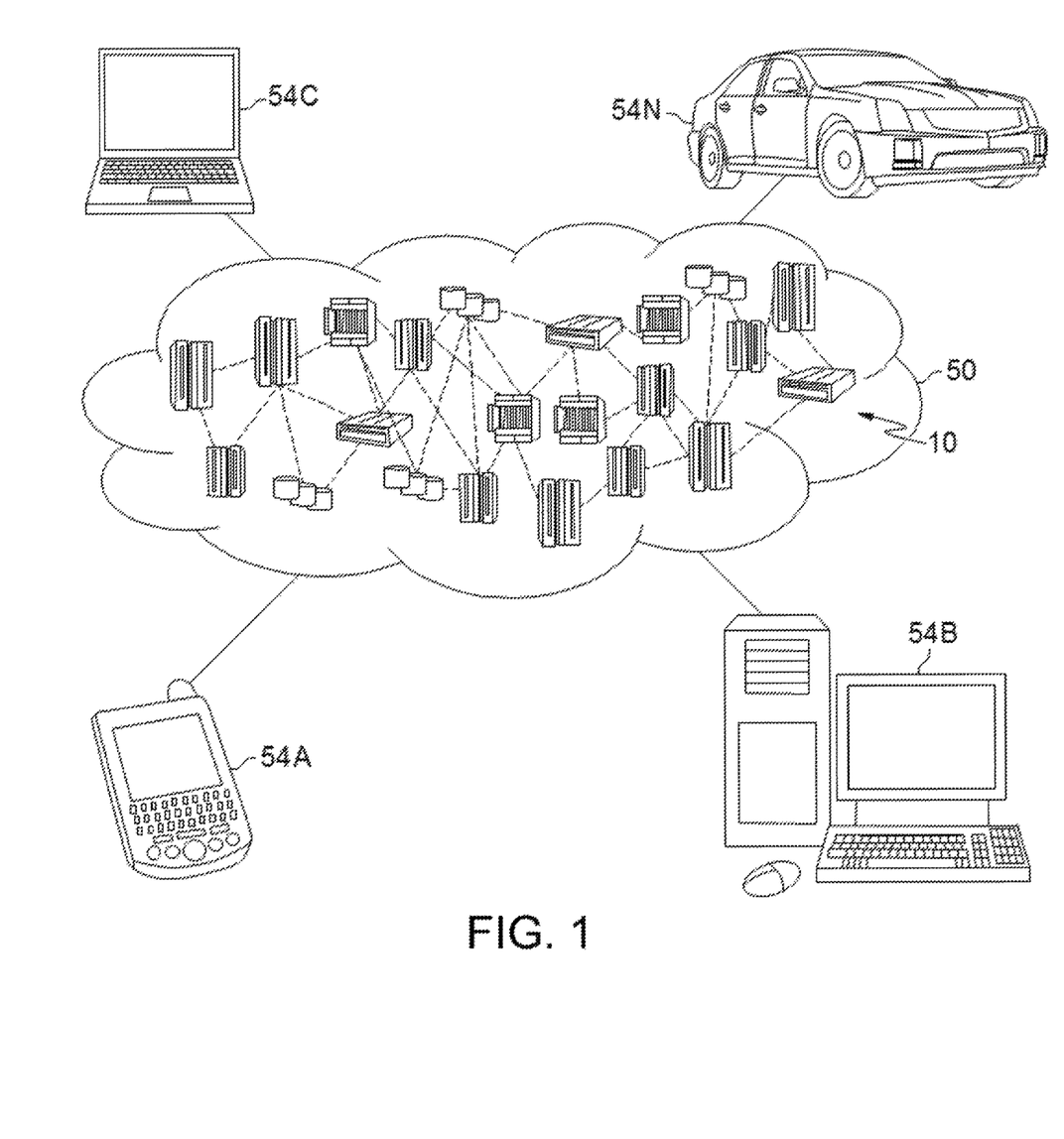
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
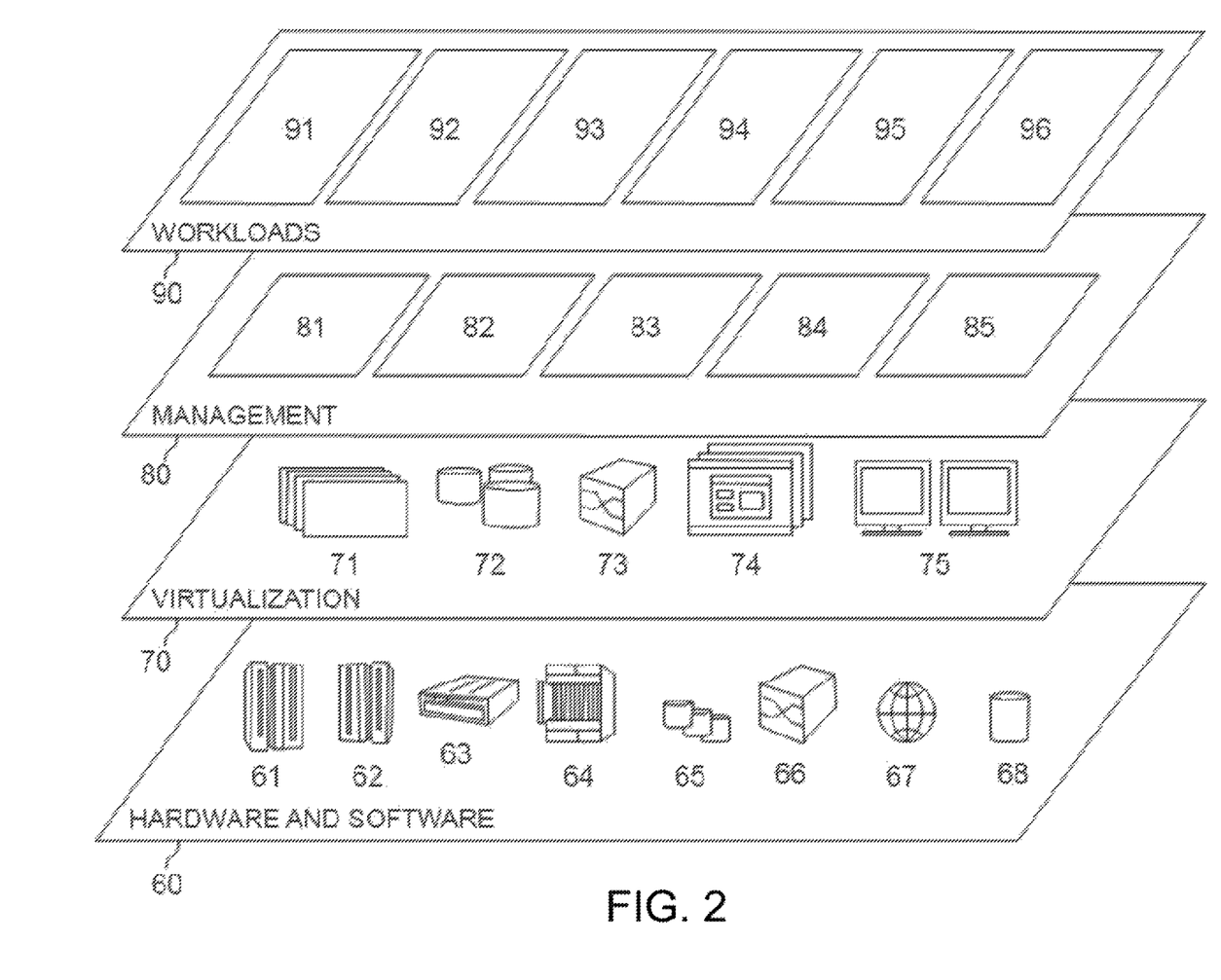
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for handling computer program runtime exceptions 96.

Figure 3:
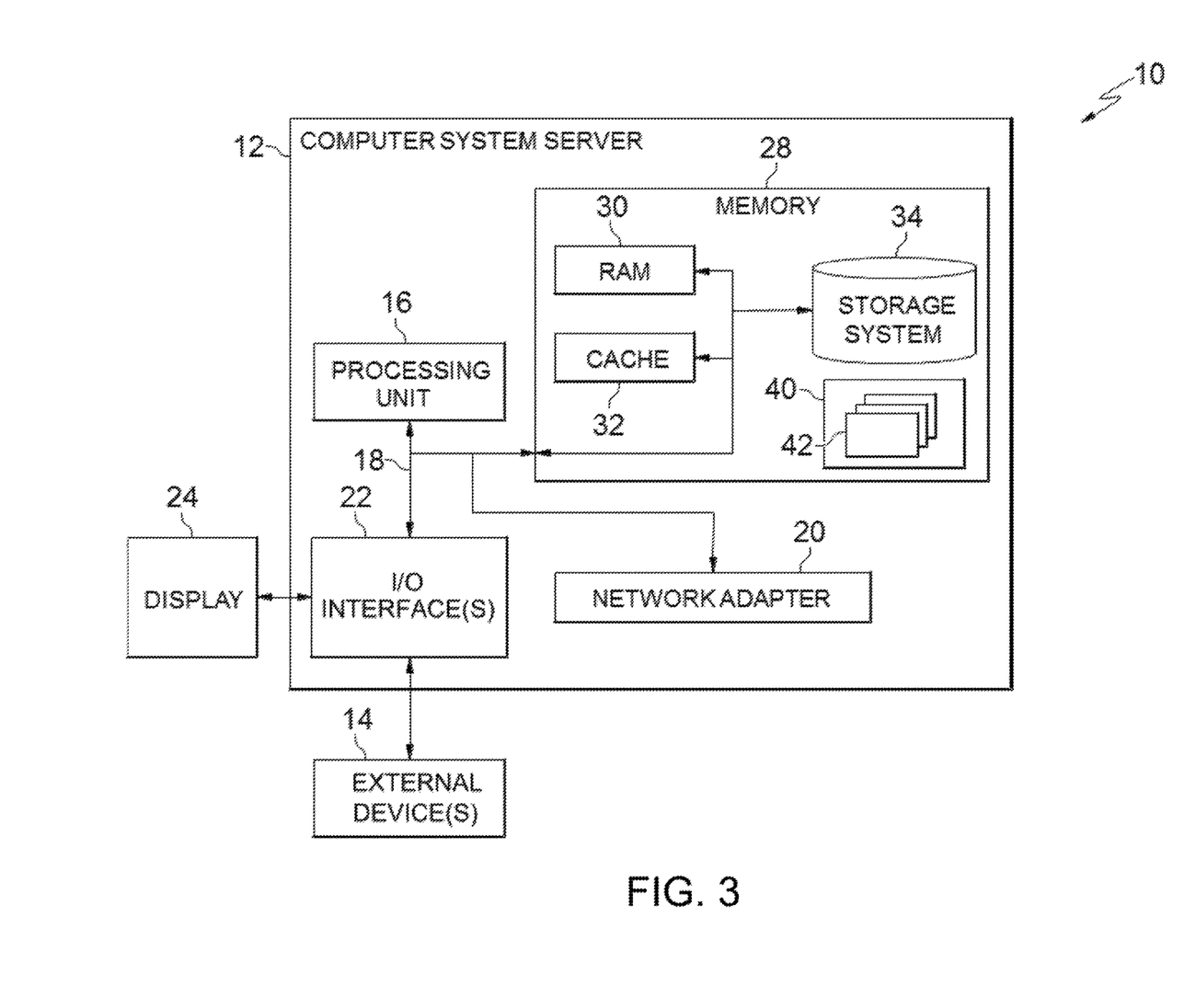
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
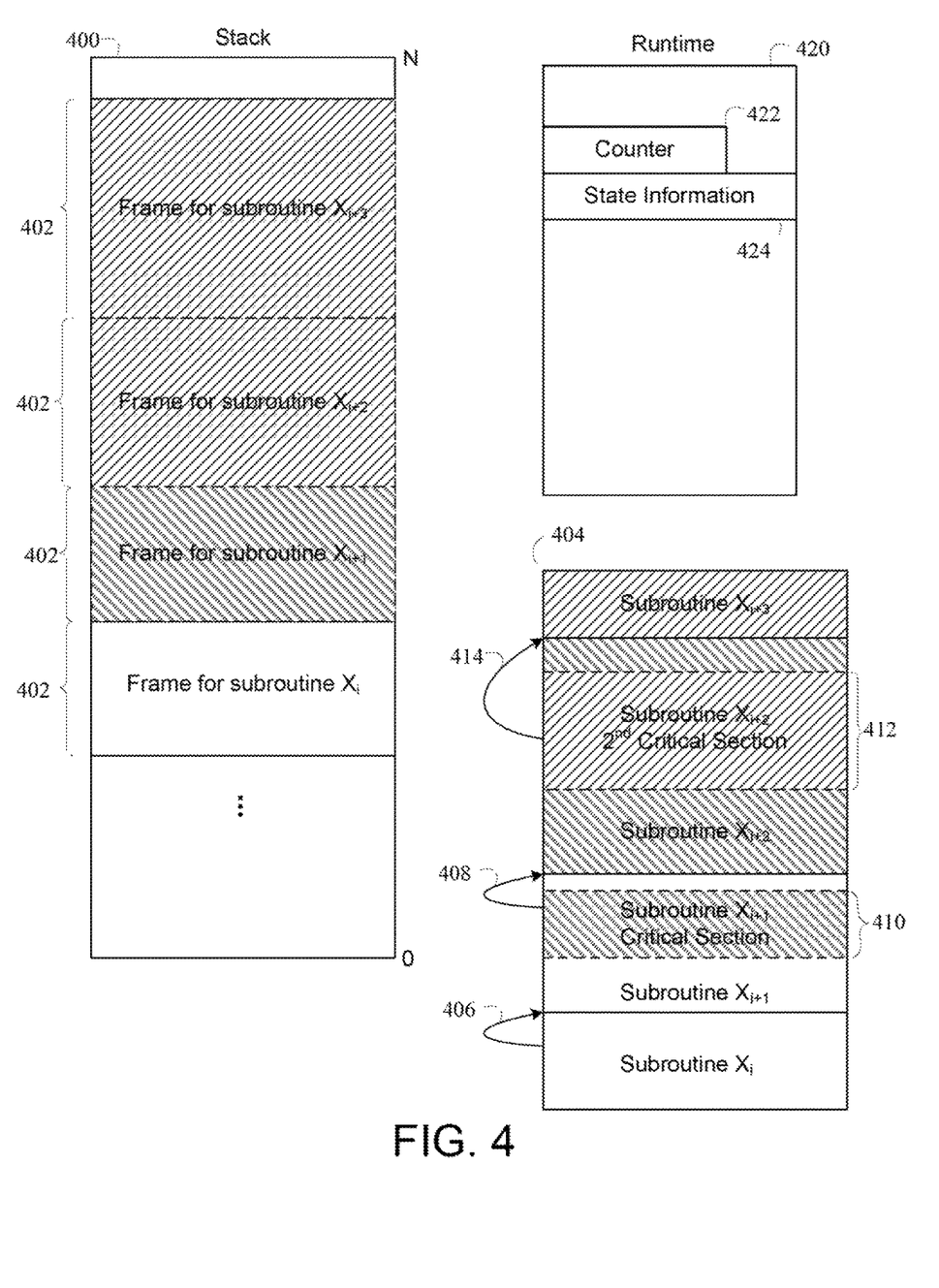
FIG. 4 depicts an example schematic illustration of an embodiment of the present invention.

FIG. 4 schematically illustrates an example according to the present invention for handling computer program runtime exceptions. A call stack 400 of N bytes of the memory 28 is illustrated where N is a positive integer. The call stack 400 illustrates stack frames 402 for each of subroutines $X_i$, $X_{i+1}$, $X_{i+2}$, and $X_{i+3}$, where i is a positive integer. Subroutine $X_i$, calls subroutine $X_{i+1}$, which adds the stack frame 402 for subroutine $X_{i+1}$ to the call stack 400. Subroutine $X_{i+1}$ calls subroutine $X_{i+2}$, which adds the stack frame 402 for $X_{i+2}$ to the call stack 400. Subroutine $X_{i+2}$, calls subroutine $X_{i+3}$ which adds the stack frame 402 for $X_{i+3}$ to the call stack 400.

The memory 28 includes program code 404 of the subroutines $X_i$, $X_{i+1}$, $X_{i+2}$, and $X_{i+3}$ of an application execution thread. A first pointer 406 indicates the call from program code of subroutine $X_i$ to subroutine $X_{i+1}$. During the execution of subroutine $X_{i+1}$ a critical section 410 of the program code is entered and a second pointer 408 indicates the call from the program code of the critical section 410 to subroutine $X_{i+2}$. During the execution of subroutine $X_{i+2}$ a second critical section 412 of program code is entered and the call from subroutine $X_{i+2}$ to subroutine $X_{i+3}$ is illustrated with a third pointer 414. Subroutine $X_{i+2}$ includes a plurality of critical sections. The critical sections of subroutine $X_{i+2}$ include a first critical section by virtue of being called from the critical section 410 of $X_{i+1}$, and a second critical section by the critical section 412 indicated with the program code of $X_{i+2}$.

The critical sections 410, 412 indicate program code to be executed as a unitary process. For example, in the transfer of funds from account A to account B, a debit is entered for account A and a corresponding credit is entered for account B. Conventionally, during the processing of the transfer, a program exception can leave the state of the processing unknown or inconsistent, such as the funds debited and not credited, funds credited and not debited, information about a state of the transaction unknown, and combinations thereof. The critical section 410, 412 can be indicated by a language keyword, statement, annotation or inference that indicates the critical section 410, 412, such as a JAVA® method annotation of jdk.internal.vm.annotation.ReservedStackAccess. JAVA is a trademark of Oracle America, Inc. in the United States and in other countries. Similar indications of the critical section 410, 412 can be added for other programming languages, such as Smalltalk, Python, and the like. The critical section 410, 412 identifies a set of programming statements with a start statement and an ending statement.

For example, subroutine $X_{i+1}$ can represent the transfer of funds, subroutine $X_{i+2}$ can represent the input/output processing of either the account debit or the account credit, and subroutine $X_{i+3}$ can represent corresponding actual input and output. During the execution of subroutine $X_{i+3}$, a program exception occurs when executing program code of program $X_{i+3}$ and control is returned to a runtime routine 420, such as a Java Virtual Machine (JVM).

The runtime routine 420 either through inspection of the call stack 400 or during execution of subroutines includes a counter 422, which counts levels of critical sections 410, 412. For example, in JAVA®, the JVM may provide a special instruction for entering and exiting the critical section 410, 412, which can be used for the counter 422. The runtime routine 420 initializes the counter 422 of levels of critical sections 410, 412 to zero at thread creation. In some embodiments, as the critical section 410, 412 is encountered during execution, the counter 422 of levels of critical sections 410, 412 is incremented by one. With the call to subroutine $X_{i+2}$, and the encounter of the critical section 412, the counter 422 is incremented again by one. As each critical section 410, 412 is exited, the counter 422 is decremented by one. In some embodiments, the runtime routine 420 includes a field 424, which includes state information about the corresponding critical section and executing program code frame(s), such as critical variables or shared data. The runtime routine 420 initializes the field 424 to null or empty at thread creation. The critical sections 410, 412 can also be identified from a context of each stack frame 402 on the call stack 400.

In response to a program exception and a zero value of the counter 422, the runtime routine 420 uses conventional program exception processing, such as discarding the stack frame(s) and immediately returning of processing to an exception handling program if present, or terminating the thread. In response to a program exception and a non-zero value of the counter 422 of levels of critical section 410, 412, the runtime routine 420 masks the program exception and defers processing until the end of the critical section 410, 412. Deferred processing can be in response to one or more of a stack overflow, a heap overflow, an interrupt signal, and an asynchronous failure, and the like, which occur within the critical section 410, 412 or within subroutine called from within the critical section 410, 412. The interrupt signal can be from other processes or threads. The asynchronous failure can include a network failure, an input failure, an output failure, and a power failure. The deferred processing can include copying or appending the state information to the field 424 in response to the program exception.

For example, subroutine $X_{i+3}$ exceeds a timeout parameter during execution in the critical sections 410, 412 and would conventionally cause an immediate program exception, which discards the stack frame or stack portion above the exception handler. The runtime routine 420 determines that the counter 422 is non-zero and defers processing a conventional stack overflow program exception, which allows processing to continue until the end of the critical sections 410, 412. Additional CPU time or a temporary expansion of the timeout parameter can be used to complete the critical sections 410, 412. Each parameter that can cause a program exception, such as a CPU or timeout limit, a memory limit, etc., can include a soft limit, which causes the deferred program exception in the critical section 410, 412 and a hard limit, which causes the immediate program exception.

For example, an interrupt is received from another thread, which conventionally can cause a program exception. If the executing program code is within the critical section 410, 412 as indicated by a non-zero counter 422, then the program exception caused by the interrupt is deferred until the counter 422 is zero, which means the critical sections 410, 412 have been completed.

Conventional processing can result in data corruption by discarding stack frames on the call stack 400, which include data that is shared or returned to calling programs. In some instances, the critical sections 410, 412 and deferred processing avoid data corruption by permitting processing to continue to the end of the critical section 410, 412, which processes data to a known state. In some instances, the deferred processing avoids data corruption by copying or appending state information to the field 424, which can be accessed by exception handler or other processing. For example, processing of the debit part of a funds transfer can continue until the debit of the account is actually performed to the file or database, or including logging state information that the debit transaction ABC of funds transfer from DEF to ABC cannot be performed. In some embodiments, local variables, shared variables and combinations thereof can be included in or copied to the field 424 of the runtime routine 420.

The deferred processing provided by counting the levels of critical sections improves the performance of the configured processor by allowing continued processing of the thread to a known or consistent state rather the continued execution to an unknown or inconsistent state, which wastes execution of the thread or produces erroneous results. In some instances, the task of the thread processing is completed within the soft limits of the deferred program exception, which means the computer completed a unit of work that conventionally would be unfinished. In some instances, the state can be determined from the field 424.

Deferrable program exceptions can be deferred until the end of the critical sections 410, 412, such as described above. With some non-deferrable program exceptions, exception handling can be deferred until after state information is copied or appended to the field 424. The state information can be passed via the field 424 to the calling subroutine or the exception handler, which uses the state information to determine the state of the transaction, such as the transfer of funds. In other types of non-deferrable program exceptions, conventional processing occurs, using an exception handler, such as a JAVA® catch clause and discarding the stack above the exception handler, or terminating the application thread.

Figure 5:
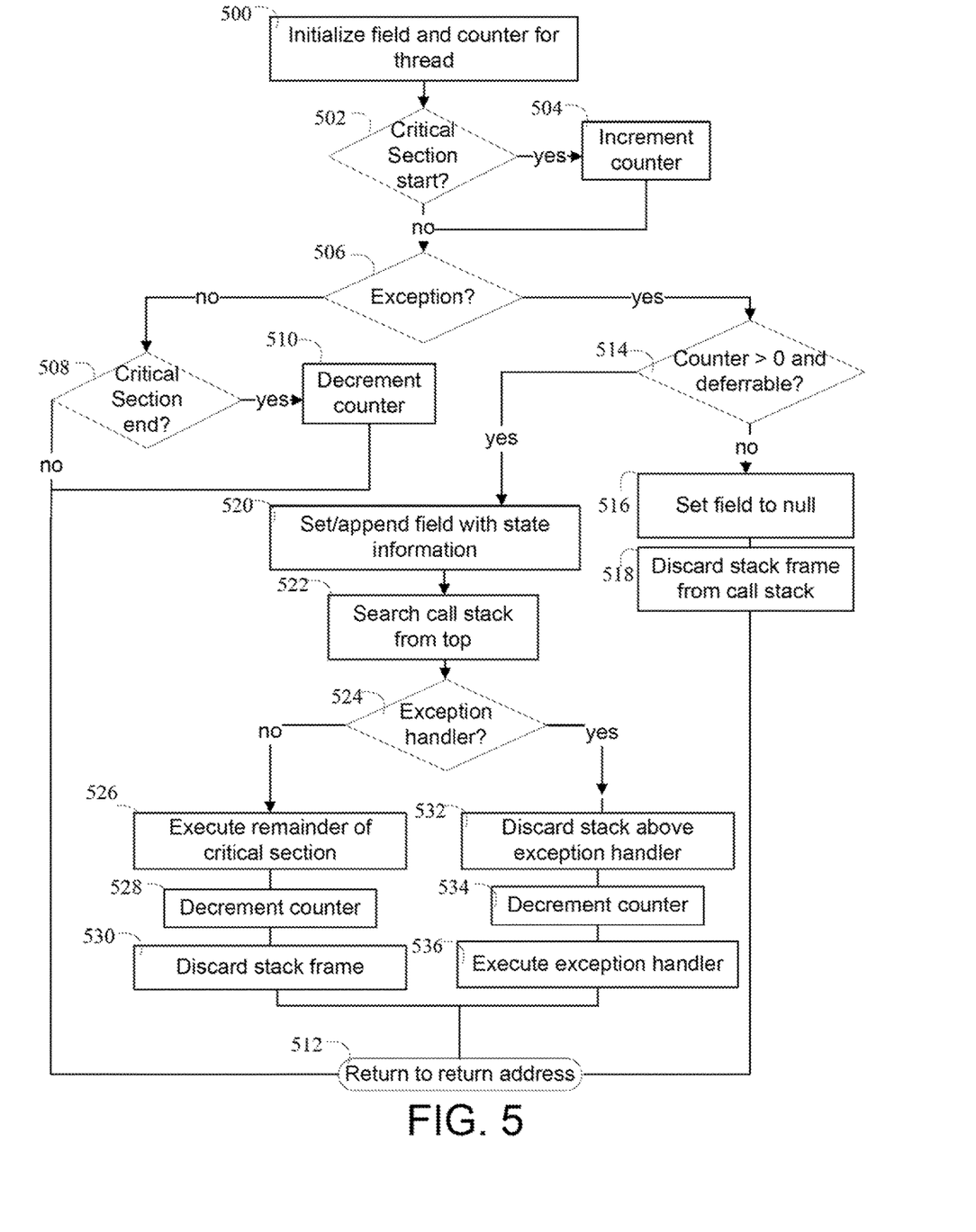
FIG. 5 is a flow chart illustration of an embodiment of the present invention.

FIG. 5 illustrates one embodiment of a method according to the present invention for handling computer program runtime exceptions. At 500, a processor that is configured according to an aspect of the present invention (the "configured processor") at thread creation initializes the counter 422 and the field 424. The counter 422 counts the levels of critical sections 410, 412. The field 424 stores state information of the executing program code causing or executing during the deferrable program exception. The counter 422 is initialized to zero and the field can is initialized to null or empty.

At 502, the configured processor determines a start of the critical section 410, 412 during program execution. The determination can be based on the presence of a programming language keyword, a programming language statement, an annotation of a programming language, an inference of the programming language, or combinations thereof that indicates the start of the critical section 410, 412.

At 504, the configured processor, in response to determining that the program execution has started the critical section 410, 412, increments the counter 422 by one.

At 506, the configured processor determines whether a program exception has occurred.

At 508, the configured processor, in response to no program exception, determines whether the critical section 410, 412 has ended. The end can be indicated by the presence of a programming language keyword, a programming language statement, an annotation or an inference that indicates the end of the critical section 410, 412. For example, an annotation can indicate a block of programming language statements that form the critical section 410, 412, which includes indicating both a start and an end of the block of programming language statements, and exiting the annotated block of programming language statements infers the end of the critical section 410, 412.

At 510, the configured processor, in response to determining that the critical section 410, 412 has ended, decrements the counter 422 by one.

At 512, the configured processor returns control to a return address, which can include a next program statement of the executing program code, a return to a calling subroutine, or terminating the application thread 410. The method can repeat starting again at 502.

At 514, the configured processor determines whether the counter 422 is non-zero and whether the program exception is deferrable. Deferrable program exceptions include a stack overflow, interrupt signals, or asynchronous failures, which occur during processing of programming language statements within the critical section 410, 412, interpreted or compiled.

At 516, the configured processor, in response to the counter 422 being zero or the program exception being non-deferrable, can set the field 424 to null. That is, the executing program code is not in the critical section 410, 412 or the program exception cannot be deferred.

At 518, the configured processor, after setting the field 424 to null, discards the stack frame(s) and returns control to the return address at 512, which can include an exception handler, an interrupter program, or terminating the application thread.

At 520, the configured processor, in response to determining that the counter 422 is non-zero and the program exception is deferrable, sets or appends the state information to the field 424. In some embodiments, the configured processor copies the state information to the field 424, which has the effect of limiting the size of the field 424 with a plurality of levels of critical sections 410, 412. That is, copying the state information to the field 424 overlays any previous state information. In some embodiments, the configured processor appends the state information to the field 424, which has the effect of providing a chain of state information in the field 424 that represents the state of each level of critical sections 410, 412.

At 522, the configured processor searches the call stack 400 from the top for an exception handler or a context of the current critical section 410, 412. The search from the top is a search in a last in first out (LIFO) order of the call stack 400.

At 524, the configured processor determines whether an exception handler is present to process the deferred program exception. For example, in JAVA®, the JVM determines whether a catch clause is present within the critical section to process the program exception.

At 526, the configured processor, in response to determining that no exception handler is present, causes the remainder of the critical section to be executed. That is, the search reached the start of the critical section and no exception handler was found. Processing continues within the critical section 412. For example, an interrupt from another thread is deferred until the critical sections 410, 412 are completed. The remainder include at least one program instruction or statement.

At 528, the configured processor decrements the counter 422 upon exit of each critical section 410, 412.

At 530, the configured processor can discard the stack frame upon exit of the critical section, and return control to the return address at 512. In instances of a plurality of critical sections, the return address includes the calling critical section and control is returned to 506 to check for a program exception within another critical section. In some instances, execution of the remainder of the critical section 410, 412 can extinguish the program exception.

At 532, the configured processor, in response to determining the presence of the exception handler, discards the portion of the call stack 400 above the exception handler.

At 534, the configured processor, after discarding the portion of the call stack 400 above the exception handler, decrements the counter 422.

At 536, the configured processor executes the exception handler. In some embodiments, the configured processor sets the return address to the exception handler and the configured processor returns control to the return address of the exception handler at 512.

Figure 6:
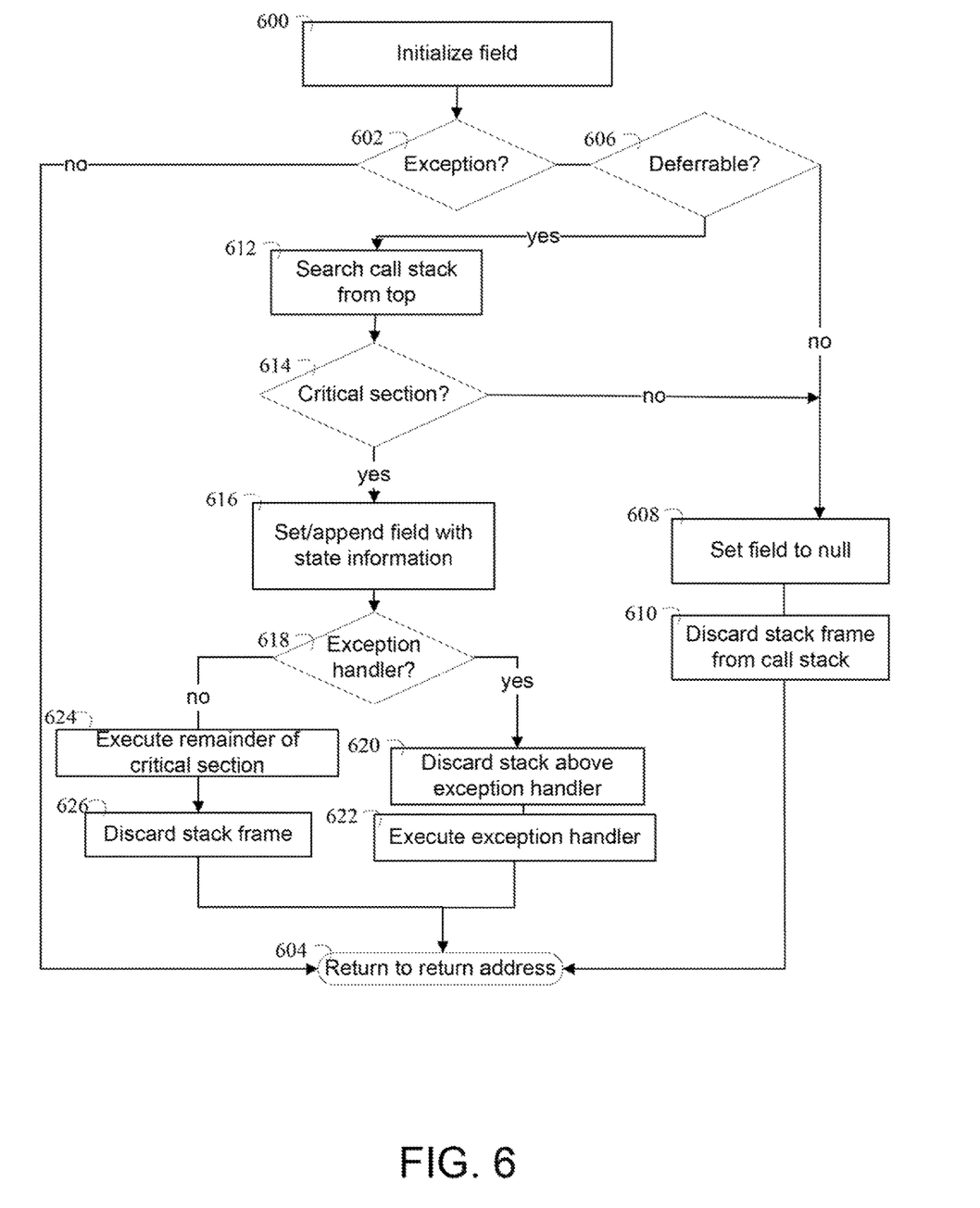
FIG. 6 is a flow chart illustration of another embodiment of the present invention.

FIG. 6 illustrates one embodiment of a method according to the present invention for handling computer program runtime exceptions. At 600, the configured processor at thread creation initializes the field 424 to null or empty.

At 602, the configured processor determines whether a program exception has occurred.

At 604, the configured processor, in response to determining that no program exception has occurred, returns to a return address, which can include a next program statement of the executing program code, a return to a calling subroutine, or a termination of the application thread.

At 606, the configured processor, in response to determining that a program exception has occurred, determines whether the program exception is deferrable. Deferrable program exceptions include a stack overflow, a heap overflow, an interrupt signal, a asynchronous failure, and the like.

At 608, the configured processor, in response to determining a non-deferrable program exception, can set the field 424 to null or empty.

At 610, the configured processor discards the stack frame from the stack and returns control to the return address at 604.

At 612, the configured processor, in response to a program exception that is deferrable, searches or inspects the call stack 400 from the top, in LIFO order and counts the levels of critical sections using the counter 422 according to the context. The search identifies the levels of critical sections 410, 412 that the application thread entered without exiting. The search includes a search for context of the critical section 410, 412 on the call stack 400. The search can include a simultaneous search for an exception handler.

At 614, the configured processor determines whether the context of the stack frame(s) 402 is within the critical section 410, 412. The determination can include determining whether the counter 422 is non-zero.

At 616, the configured processor, in response to determining that the context of the stack frame(s) 402 is within the critical section 414, sets the field 424 to the state information of the currently executing program code or appends the state information of the currently executing program code to the field 424.

At 618, the configured processor determines whether the context of the critical section includes the context of the exception handler from the search of the call stack 400.

At 620, the configured processor, in response to determining the context of the exception handler exists and is within the context of the critical section, discards the portion of the call stack 400 above the exception handler context.

At 622, the configured processor executes the exception handler. In some embodiments, the return address is set at the start of the exception handler and control is returned to the exception handler at 604.

At 624, the configured processor, in response to determining that no exception handler exists within the context the critical section 410, 412, executes the remainder of the critical sections 410, 412.

At 626, the configured processor can discard the stack frame upon exit of the critical section, and control returns to the return address at 602. In some instances, execution of the remainder of the critical section 410, 412 can extinguish the program exception.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for handling computer program runtime exceptions, comprising executing on a computer processor:
   in response to a program exception in an application thread that is deferrable, inspecting a call stack for context of critical sections of program code that the application thread entered without exiting;
   determining that a currently executing statement of the program code is within the critical sections based on the inspected call stack;
   counting for the application thread levels of critical sections of program code that the application thread entered without exiting according to the inspected call stack; and
   in response to the program exception in the application thread that is deferrable and a non-zero count of the levels of critical sections, executing a remainder of program code within the critical sections of program code.

2. The method of claim 1, wherein counting includes:
   incrementing a value of a counter during execution of the program code in response to entering a start of each critical section of the program code;
   decrementing the value of the counter during execution of the program code in response to exiting an end of each critical section of the program code; and
   executing the remainder of program code within the critical sections of program code in response to a non-zero value of the counter.

3. The method of claim 1, wherein each critical section of program code includes a start and an end indicated by at least one indicator selected from a group consisting of a programming language keyword, a programming language statement, an annotation of a programming language, and an inference of a programming language statement.

4. The method of claim 1, further comprising
   in response to the program exception in the application thread that is deferrable, storing state information of the executing program code for the application thread.

5. The method of claim 1, wherein the deferred program exception comprises at least one program exception selected from a group consisting of a stack overflow, an interrupt signal, and an asynchronous failure.

6. The method of claim 1, wherein the application thread comprises a plurality of levels of critical sections, each critical section of the plurality of levels of critical section is entered without exiting.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer readable storage medium via the computer readable memory and thereby performs the counting for the application the thread levels of critical section of program code, and in response to the program exception in the application thread that is deferrable and the non-zero count of the levels of critical sections, executing the remainder of program code within the critical section of program code.

8. A system for handling computer program runtime exceptions, comprising:
a processor;
a computer readable memory in circuit communication with the processor; and
a computer readable storage medium in circuit communication with the processor;
wherein the processor executes program instructions stored on the computer readable storage medium via the computer readable memory and thereby:
in response to a program exception in an application thread that is deferrable, inspects a call stack for context of critical sections of program code that the application thread entered without exiting;
determines that a currently executing statement of the program code is within the critical sections based on the inspected call stack;
counts for the application thread levels of critical sections of program code that the application thread entered without exiting according to the inspected call stack; and
in response to the program exception in the application thread that is deferrable and a non-zero count of the levels of critical sections, executes a remainder of program code within the critical sections of program code.

9. The system of claim 8, wherein the processor executes program instructions stored on the computer readable storage medium via the computer readable memory and thereby:
increments a value of a counter during execution of the program code in response to entering a start of each critical section of the program code;
decrements the value of the counter during execution of the program code in response to exiting an end of each critical section of the program code; and
executes the remainder of program code within the critical sections of program code in response to a non-zero value of the counter.

10. The system of claim 8, wherein each critical section of program code includes a start and an end indicated by at least one indicator selected from a group consisting of a programming language keyword, a programming language statement, an annotation of a programming language, and an inference of a programming language statement.

11. The system of claim 8, wherein the processor executes program instructions stored on the computer readable storage medium via the computer readable memory and thereby:
in response to the program exception in the application thread that is deferrable, stores state information of the executing program code for the application thread.

12. The system of claim 8, wherein the deferred program exception comprises at least one program exception selected from a group consisting of a stack overflow, an interrupt signal, and an asynchronous failure.

13. A computer program product for handling computer program runtime exceptions, the computer program product comprising:
a computer readable storage medium having computer readable program code embodied therewith, the computer readable program code comprising instructions for execution by a processor that causes the processor to:
in response to a program exception in an application thread that is deferrable, inspect a call stack for context of critical sections of program code that the application thread entered without exiting;
determine that a currently executing statement of the program code is within the critical sections based on the inspected call stack;
count for the application thread levels of critical sections of program code that the application thread entered without exiting according to the inspected call stack; and
in response to the program exception in the application thread that is deferrable and a non-zero count of the levels of critical sections, execute a remainder of program code within the critical sections of program code.

14. The computer program product of claim 13, wherein the instructions for execution cause the processor to:
increment a value of a counter during execution of the program code in response to entering a start of each critical section of the program code;
decrement the value of the counter during execution of the program code in response to exiting an end of each critical section of the program code; and
execute the remainder of program code within the critical sections of program code in response to a non-zero value of the counter.

15. The computer program product of claim 13, wherein each critical section of program code includes a start and an end indicated by at least one indicator selected from a group consisting of a programming language keyword, a programming language statement, an annotation of a programming language, and an inference of a programming language statement.

16. The computer program product of claim 13, wherein the instructions for execution cause the processor to:
in response to the program exception in the application thread that is deferrable, stores state information of the executing program code for the application thread.

17. The computer program product of claim 13, wherein the deferred program exception comprises at least one program exception selected from a group consisting of a stack overflow, an interrupt signal, and an asynchronous failure.

* * * * *

UNITED STATES PATENT AND TRADEMARK OFFICE
CERTIFICATE OF CORRECTION

PATENT NO. : 10,795,800 B2
APPLICATION NO. : 16/125890
DATED : October 6, 2020
INVENTOR(S) : Peter Douglas Bain et al.

Page 1 of 1

It is certified that error appears in the above-identified patent and that said Letters Patent is hereby corrected as shown below:

On the Title Page

Item (72) Inventors: should read as follows:
Peter Douglas Bain, Ottawa (CA);
Graham A. Chapman, Nepean (CA);
Daniel Heidinga, Ottawa (CA)

Signed and Sealed this
Seventh Day of February, 2023

Katherine Kelly Vidal
*Director of the United States Patent and Trademark Office*